United States Patent
Corey, Jr. et al.

(10) Patent No.: US 9,387,982 B1
(45) Date of Patent: Jul. 12, 2016

(54) SOFT CATCH APPARATUS

(71) Applicant: Amazon Technologies, Inc., Seattle, WA (US)

(72) Inventors: Robert Edward Corey, Jr., Fort Worth, TX (US); Douglas Wayne Kegley, Jr., Fort Worth, TX (US); John Saltzman, Phoenix, AZ (US); Carolyn Elizabeth Sinnott, Washington, DC (US); David Arthur Ogle, II, Bridgeport, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/854,165

(22) Filed: Sep. 15, 2015

(51) Int. Cl.
*B65D 88/56* (2006.01)
*B65D 88/54* (2006.01)
*B65G 11/20* (2006.01)
*B65G 37/00* (2006.01)

(52) U.S. Cl.
CPC .............. *B65D 88/56* (2013.01); *B65G 11/203* (2013.01); *B65G 37/00* (2013.01); *B65G 2201/02* (2013.01)

(58) Field of Classification Search
CPC ...... B65D 88/546; B65D 88/56; B65D 29/04; B65G 11/203; B65G 11/103
USPC ......................................................... 414/408
See application file for complete search history.

(56) References Cited

U.S. PATENT DOCUMENTS

| | | | | |
|---|---|---|---|---|
| 2,452,243 A * | 10/1948 | Johnson | ................ | B65D 88/56 294/68.27 |
| 3,856,164 A * | 12/1974 | Torvund | ................ | B65D 88/56 414/422 |
| 5,344,048 A * | 9/1994 | Bonerb | ............... | B65B 69/0075 222/105 |
| 5,407,055 A * | 4/1995 | Tanaka | ................... | B65G 17/36 198/429 |
| 5,951,230 A * | 9/1999 | Kruzick | ................. | B65D 88/56 414/420 |
| 7,635,064 B2 * | 12/2009 | Wang | ..................... | B65D 37/00 220/4.28 |
| 7,665,596 B2 * | 2/2010 | Kolbe | .................... | B30B 11/08 193/31 A |
| 7,946,764 B2 * | 5/2011 | Sulpizio | ............... | B65D 33/007 383/104 |
| 2008/0053995 A1 * | 3/2008 | Wang | ................... | B65D 21/068 220/9.2 |
| 2011/0024435 A1 * | 2/2011 | MacNabb | .............. | B65D 88/52 220/666 |
| 2014/0119677 A1 * | 5/2014 | Lerner | .................... | B65B 61/02 383/37 |

* cited by examiner

*Primary Examiner* — Thomas Randazzo
(74) *Attorney, Agent, or Firm* — Thomas | Horstemeyer, LLP

(57) ABSTRACT

Disclosed are various embodiments for an apparatus that dampens or reduces the impact of an item as it is discharged from a device, such as a conveyer belt. An apparatus may comprise, for example, a basket assembly that receives items as they are discharged from a chute, a conveyer belt, or other device. The basket assembly may comprise a netting material that catches or receives items as they are displaced, dampens or reduces the impact of the items, and allows the items to slide to a bottom of a receptacle. A height of the basket assembly may be adjusted by an actuator as the receptacle is filled with items. In addition, the basket assembly may be rotated as the receptacle is filled.

20 Claims, 14 Drawing Sheets

SOFT CATCH APPARATUS

BACKGROUND

Packages are often moved around warehouses and other facilities using conveyer belt systems at a high rate of speed. As packages are unloaded from conveyer belt systems, the packages do not necessarily reduce speed before coming into contact with a receiving surface. As a result, contents of the packages can be harmed or broken. For example, displays for electronic devices can be broken or shattered.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to soft catching packages as they are dropped into a container. To dampen or reduce the impact of an item as it is displaced from a conveyer belt, for example, a soft catch apparatus may be employed according to various embodiments of the present disclosure. A soft catch apparatus may comprise, for example, a basket assembly that receives items as they are displaced from a chute, a conveyer belt, or other device. The basket assembly may comprise a basket made up of a suitable material that catches or receives items as they are displaced, dampens or reduces the impact of the items, and allows the items to gently slide or fall to a bottom of a receptacle.

Further, the soft catch apparatus may comprise a static frame assembly, a moving frame assembly moveably attached to the static frame assembly, and the basket assembly moveably attached to the moving frame assembly. An actuator of the static frame assembly may cause translational (e.g., vertical) movement of the moving frame assembly, as well as translational and rotational movement of the basket assembly. For example, the movement of the moving frame assembly positions the basket assembly to catch items as they are loaded into the receptacle. As more items are placed in the receptacle, the actuator may cause the basket assembly to elevate and/or rotate, such that the basket assembly fully clears a top of the receptacle when the receptacle contains a maximum amount of items.

In the following discussion, a general description of the soft catch apparatus and its components is provided, followed by a discussion of the operation of the same.

Figure 1:
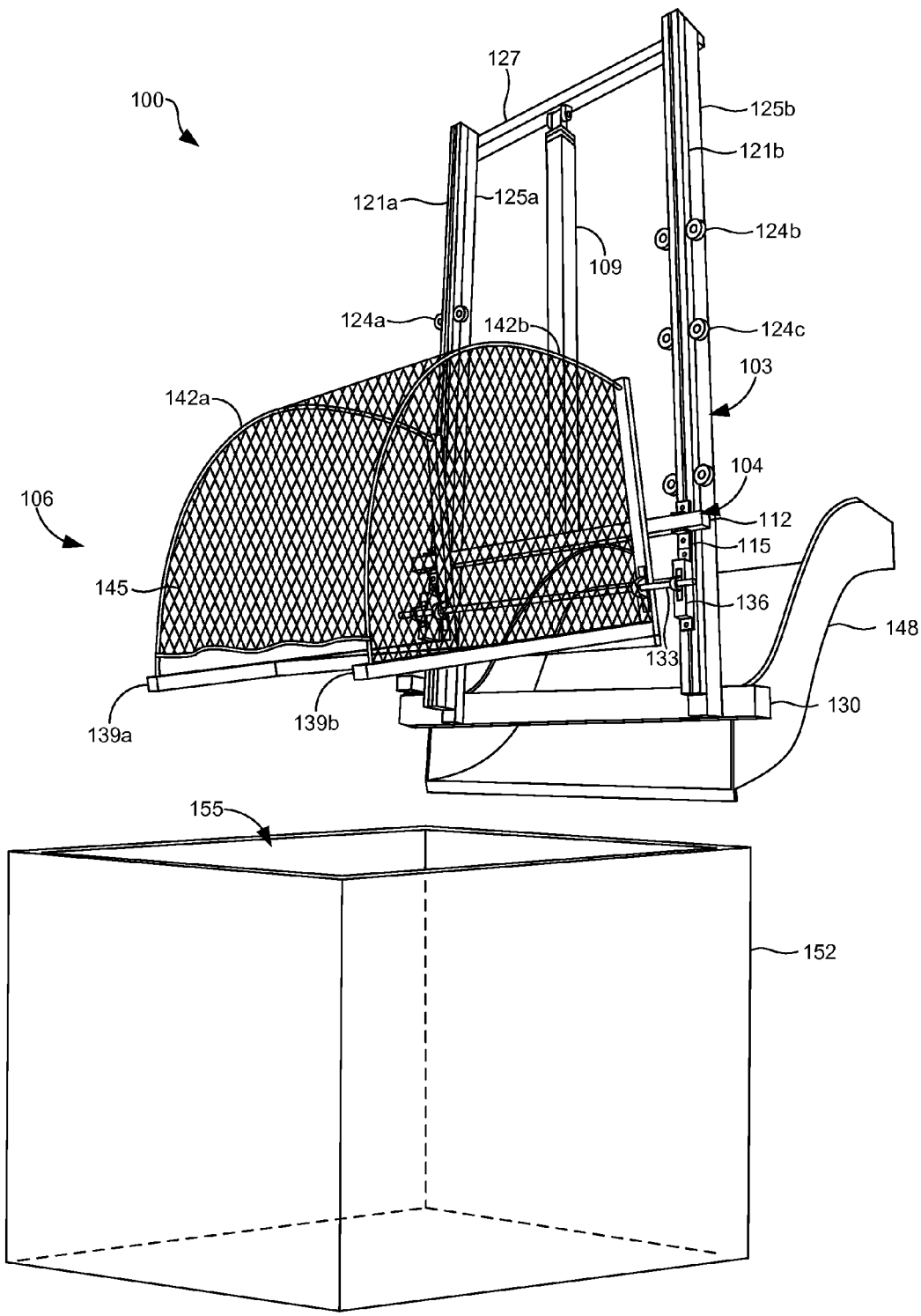
FIGS. 1-6 are drawings of a soft catch apparatus according to various embodiments of the present disclosure.

With reference to FIG. 1, shown is soft catch apparatus 100 for catching packages or other items being dropped into a container according to various embodiments. In the example of FIG. 1, the soft catch apparatus 100 may comprise a static frame assembly 103, a moving frame assembly 104, and a basket assembly 106 coupled to the moving frame assembly 104. The moving frame assembly 104 may be moveably attached to the static frame assembly 103 to facilitate movement of the basket assembly 106, as will be described. The soft catch apparatus 100 may comprise a hanging arrangement where a top portion of the static frame assembly 103 is mounted to a roof, beam, trestle, or other suitable structure. The soft catch apparatus 100 may comprise a square or tubular frame composed of aluminum, steel, plastic, or other suitable material.

The moving frame assembly 104 may control a position of the basket assembly 106 relative to the static frame assembly 103. For example, the soft catch apparatus 100 may comprise an actuator 109 that extends or retracts vertically such that a support arm 112 coupled to the actuator 109 causes the basket assembly 106 to move up and down and/or rotate, as will be described. In various embodiments, the actuator 109 may comprise a linear actuator, a telescoping linear actuator, or other suitable actuator that causes linear movement. Further, in some embodiments, the actuator 109 may comprise a mechanical actuator, a hydraulic actuator, a pneumatic actuator, an electro-mechanical actuator, or other suitable actuator. To this end, the actuator 109 may comprise an actuator rod (not shown) that extends out from or retracts into an interior of the actuator 109.

In various embodiments, the moving frame assembly 104 may comprise the support arm 112, support brackets 115, a first moving arm 121a, and a second moving arm 121b. The support arm 112 may be coupled to the first moving arm 121a and the second moving arm 121b (collectively moving arms 121) via the support brackets 115 to allow vertical movement of the support arm 112 guided by wheels 124a ... 124d of the static frame assembly 103. In various embodiments, the support arm 112, the support brackets 115, and the moving arms 121 move up or down together relative to fixed, static frame members 125a ... 125b of the static frame assembly 103. In various embodiments, the wheels 124a ... 124d may be attached to the static frame members 125a ... 125b to facilitate movement of the first moving arm 121a and the second moving arm 121b of the moving frame assembly 104. In various embodiments, components other than the wheels 124a ... 124d may facilitate sliding or vertical movement of the moving frame assembly 104 relative to the static frame assembly 103. For example, tracks, pin and groove arrangements, or other arrangements may allow the moving arms 121 of the moving frame assembly 104 to slide relative to the static frame assembly 103.

In some embodiments, the static frame members 125a ... 125b may be positioned behind the moving arms 121. In other embodiments, the static frame members 125a ... 125b may be located in other suitable locations to facilitate movement of the support arm 112, the support brackets 115, and the moving arms 121 of the moving frame assembly 104 relative to the static frame assembly 103.

Although the wheels 124a ... 124d are depicted in FIG. 1 as being external to the static frame assembly 103, in some embodiments, the wheels 124*a* ... 124*d* may be internal to the static frame members 125*a* ... 125*b*. Further, the static frame assembly 103 may comprise a top mounting arm 127 and/or a bottom mounting arm 130 to couple the static frame members 125*a* ... 125*b*. In some embodiments, a top of the actuator 109 may be coupled to a bottom of the top mounting arm 127. However, in other embodiments, the actuator 109 may be coupled to the static frame assembly 103 at other suitable locations.

The basket assembly 106 may be coupled to the moving frame assembly 104, such that movement initiated by the actuator 109 attached to the static frame assembly 103 causes the basket assembly 106 to move vertically with a vertical movement of the support arm 112, the support brackets 115, and the moving arms 121 of the moving frame assembly 104. Additionally, the movement initiated by the actuator 109 may cause the basket assembly 106 to rotate about a rotational axis, e.g., an axis defined by a rod 133 of the basket assembly 106, as will be discussed. The rod 133 may be coupled to any of the support arm 112, the support brackets 115 or the moving arms 121 by rod mounts 136. As a result, the rod 133, rod mounts 136 and other components of the basket assembly 106 may move vertically along with the moving frame assembly 104.

In various embodiments, the basket assembly 106 may comprise frames 139*a* and 139*b* (collectively frames 139), catch supports 142*a* and 142*b* (collectively catch supports 142), and a catch material 145 disposed between the frames 139 and/or catch supports 142. The catch material 145 may be attached to the catch supports 142 to form a basket which may facilitate the sliding of items down the catch material 145 into a receiving container. The catch material 145 may comprise, for example, a mesh fabric, a canvas fabric, or other suitable type of fabric or sheet material made up of nylon, cotton, polyester, plastics, metals, other natural or synthetic fibers or materials, a combination thereof, or other suitable force-absorbing material. In various embodiments, the catch supports 142 may be curved or bowed to form a basket comprising curved catch material.

During operation of the soft catch apparatus 100, a package or other item may be displaced from a conveyer belt using a chute 148, a slide, or other device. The actuator 109 may be extended or retracted to cause the basket assembly 106 to move vertically (e.g., upwards or downwards) and rotate about the rod 133 to a suitable position where the catch material 145 will receive the package or other item. As the item makes contact with the catch material 145, the force of the item as it leaves the chute 148, conveyer belt, or other device is dampened or reduced. As a result, a force of impact of the item with a receptacle 152 or items in the receptacle 152 is lessened. In various embodiments, the receptacle 152 may comprise a gaylord, a box, a plastic container, or other suitable container. For example, if the catch material 145 forms a basket, the package or other item will slide down a curved portion of the catch material 145 to softly land in an interior 155 of the receptacle 152.

In various embodiments, the structural members of the static frame assembly 103, the moving frame assembly 104, the basket assembly 106, and/or other components of the soft catch apparatus 100 may comprise square, rectangular, and/or tubular beams composed of aluminum, steel, copper, plastic, a combination thereof, or other suitable materials. The catch material 145 of the basket assembly 106 may comprise nylon, cotton, polyester, plastics, metals, other natural or synthetic fibers or materials, a combination thereof, or other suitable force-absorbing material. Further, the structural members of the static frame assembly 103, the moving frame assembly 104, the basket assembly 106, and/or other components of the soft catch apparatus 100 may assume different shapes and sizes, may comprise different materials, and may be constructed in different arrangements to accomplish the same or similar functions.

Figure 2:
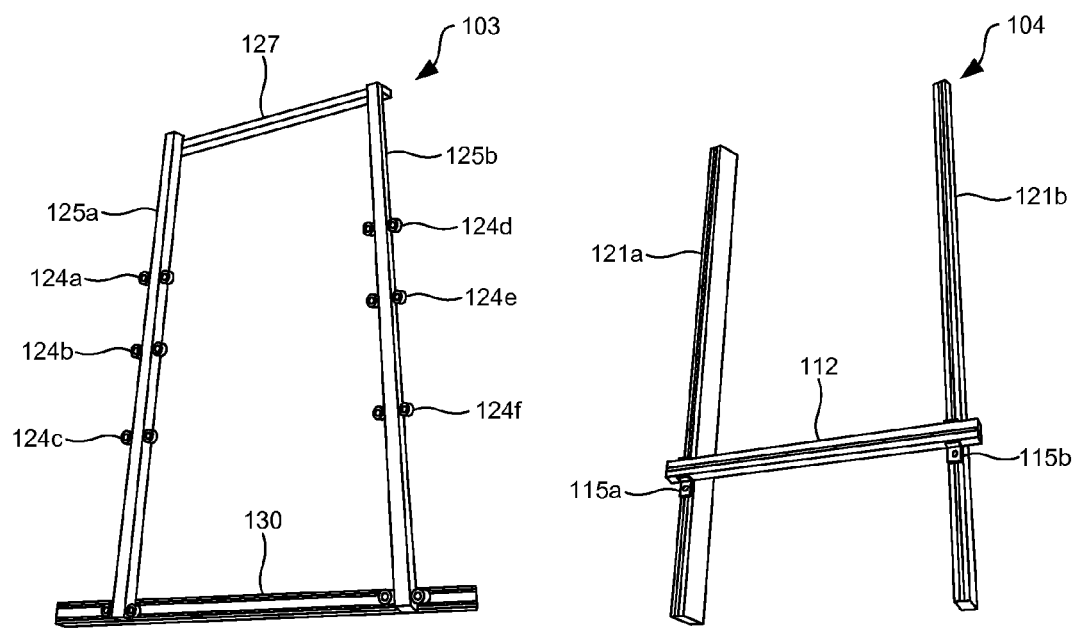
Figure 2:
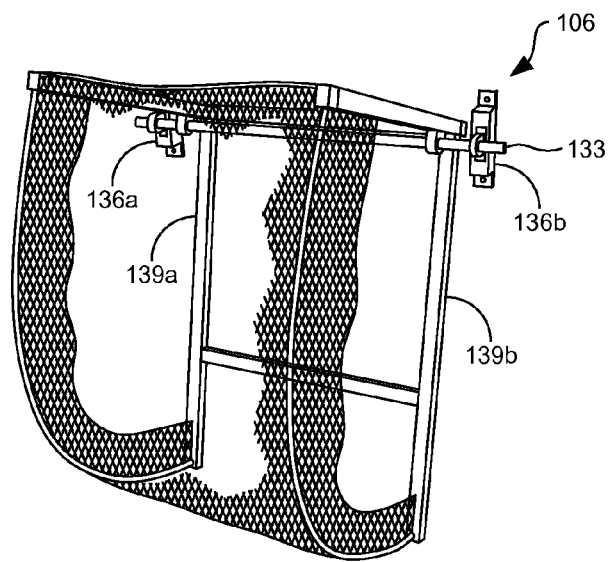

Moving on to FIG. 2, shown is a deconstructed view of the static frame assembly 103, the moving frame assembly 104, and the basket assembly 106. In various embodiments, the static frame assembly 103 may comprise static frame members 125*a* ... 125*b*, wheels 124*a* ... 124*f*, the top mounting arm 127, and the bottom mounting arm 130. The moving frame assembly 104 may comprise a first moving arm 121*a*, a second moving arm 121*b*, a support arm 112, and support brackets 115.

The static frame assembly 103 may receive the moving frame assembly 104 to facilitate movement of the moving frame assembly 104 and the basket assembly 106. In one example, the moving arms 121*a* ... 121*b* of the moving frame assembly 104 are positioned in front of the static frame members 125*a* ... 125*b* of the static frame assembly 103. When the static frame assembly 103 receives the moving frame assembly 104, the support arm 112 may be positioned at a front of the soft catch apparatus 100 to control movement of the basket assembly 106 as the moving frame assembly 104 moves upwards or downwards. Further, as the moving frame assembly 104 moves vertically along the static frame assembly 103, the support arm 112 may also move vertically on a front side of the static frame assembly 103.

The wheels 124*a* ... 124*f* may be attached to the static frame members 125*a* ... 124*b* of the static frame assembly 103. The wheels 124 may guide the moving arms 121 of the moving frame assembly 104, as well as the support arm 112 and the support brackets 115, to move vertically relative to the static frame assembly 103. For example, the wheels 124*a* ... 124*f* of the static frame assembly 103 may rotate based on the linear movement caused by the actuator 109 (FIG. 1) coupled between the top mounting arm 127 and the support arm 112. In other embodiments, the moving arms 121*a* ... 121*b* of the moving frame assembly 104 may be received inside or at other suitable locations of the static frame members 125*a* ... 125*b*. Similarly, the actuator 109 may cause a rotation of interior wheels (not shown) that guide the moving frame assembly 104 to move vertically relative to the static frame assembly 103. Alternatively, the moving frame assembly 104 may be slidably coupled to the static frame assembly 103 via tracks or pin-and-groove arrangements, for example, without the use of wheels or other rolling elements.

The basket assembly 106 may comprise, for example, a rod 133, rod mounts 136*a* ... 136*b*, and catch material 145 disposed between basket frames 139*a* ... 139*b* to form a basket that is moveably attached to the moving frame assembly 104. The basket assembly 106 may be coupled to any of the support arm 112, the support brackets 115*a* ... 115*b* or the moving arms 121 of the moving frame assembly 104 through the rod mounts 136*a* ... 136*b*. As the moving frame assembly 104 moves vertically based on the movement of the actuator 109, the basket assembly 106 moves vertically relative to the static frame assembly 103 with the support arm 112, the support brackets 115, and the moving arms 121*a* ... 121*b*. Additionally, the movement of the actuator 109 may cause the basket assembly 106 to rotate about the rod 133, as will be discussed.

Figure 3:
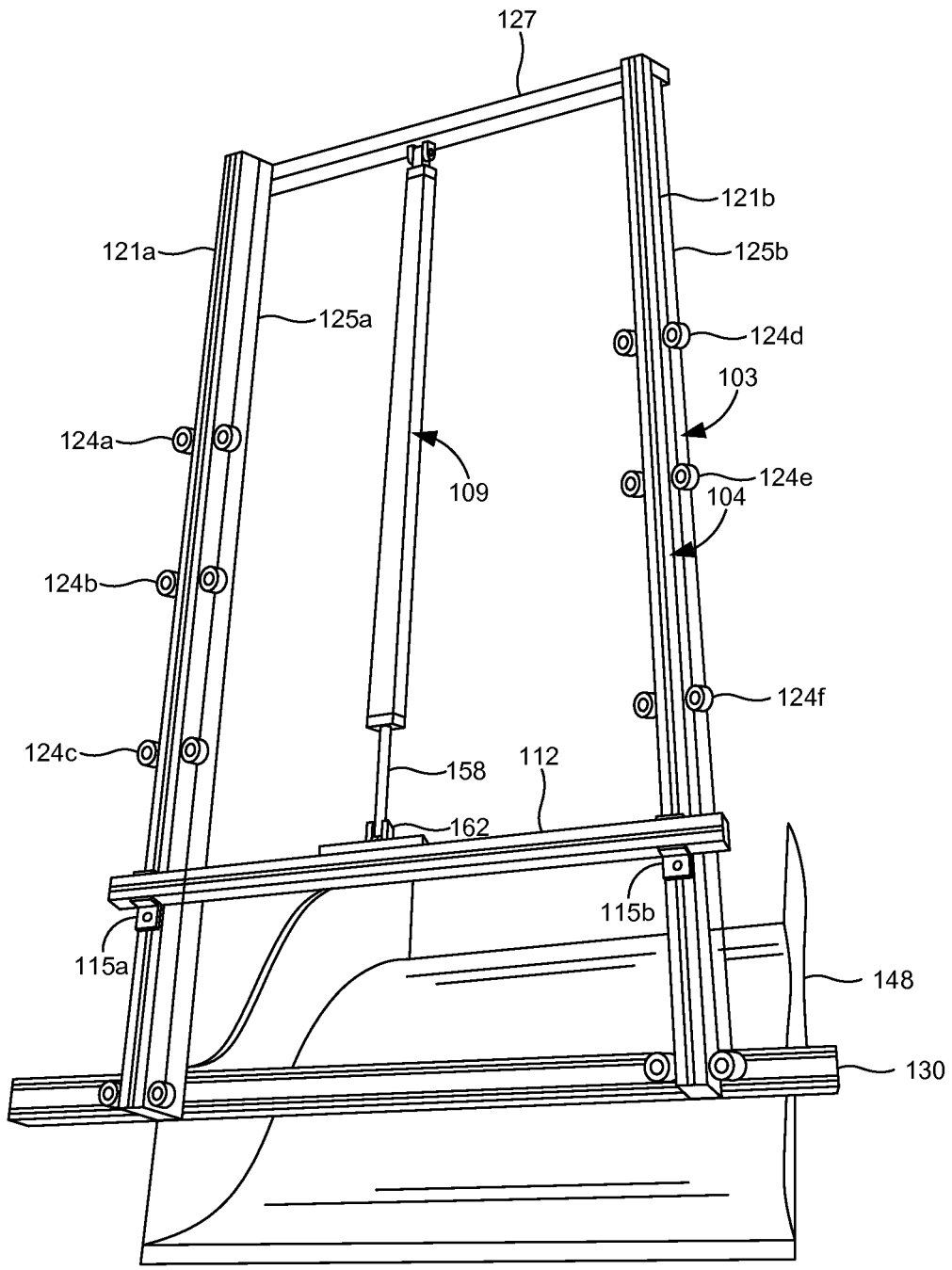

Referring next to FIG. 3, shown is an example of the static frame assembly 103 and the moving frame assembly 104 of the soft catch apparatus 100 (FIG. 1) with the basket assembly 106 (FIG. 1) removed for sake of explanation. The static frame assembly 103 may be configured to mount the soft catch apparatus 100 to an appropriate structure, such as a roof, a beam, a trestle, or other suitable structure. For example, mounting brackets (not shown) may be employed to couple the top mounting arm 127 and/or other suitable portion of the soft catch apparatus 100 to a structure.

Further, an actuator 109 may extend or retract an actuator rod 158 from an interior of the actuator 109, such that the support arm 112 coupled to the actuator 109 by the actuator connector 162 moves vertically (e.g., upwards or downwards) relative to the static frame assembly 103. As the support arm 112 is also coupled to the support brackets 115 and to the moving arms 121a . . . 121b, the moving frame assembly 104 moves vertically relative to the static frame assembly 103 based on the movement of the actuator 109.

Figure 4:
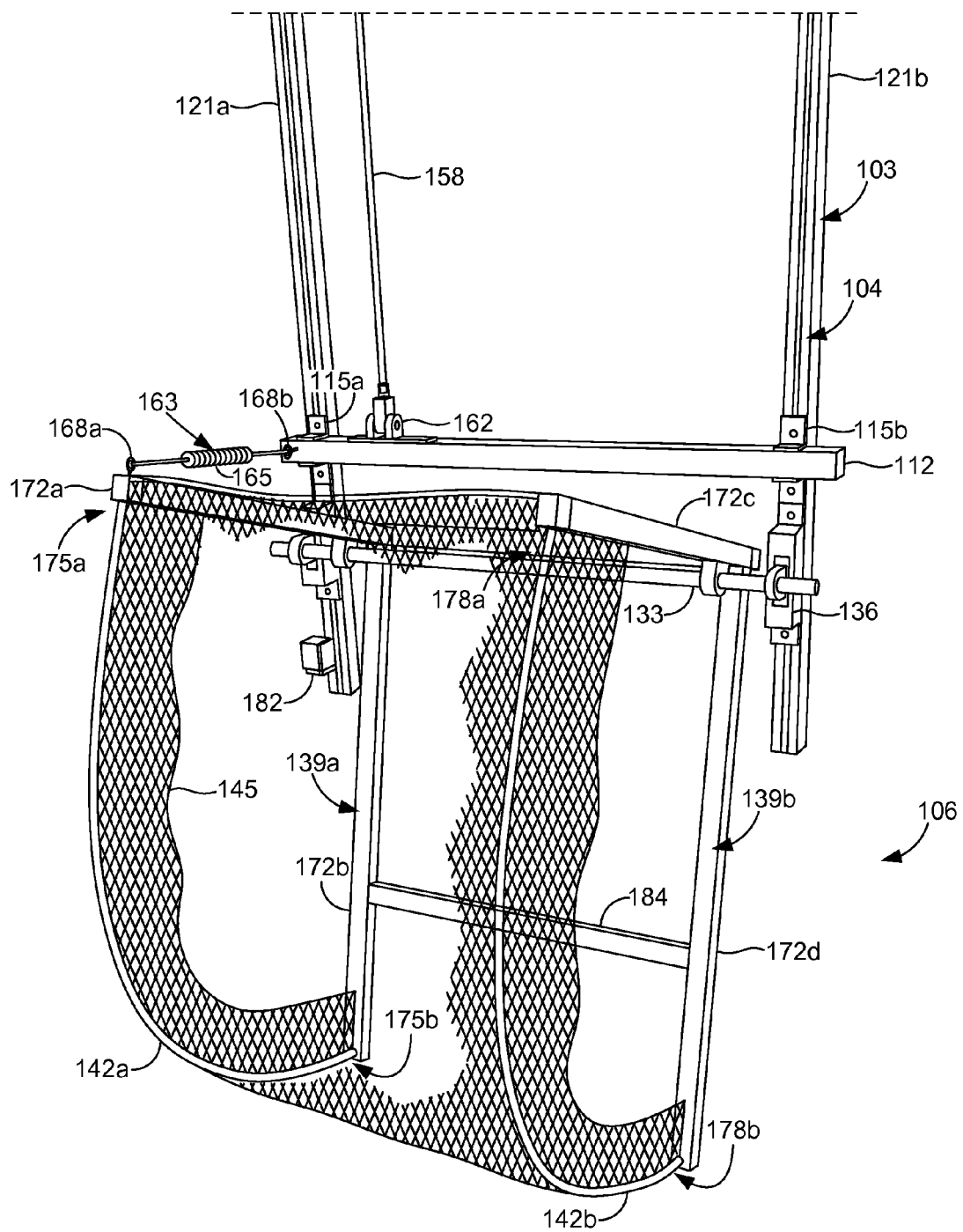

Turning now to FIG. 4, shown is another example of the soft catch apparatus 100 according to various embodiments. In the example of FIG. 4, the basket assembly 106 is shown in a lowered position, where the actuator 109 (FIG. 1) is extended. As may be appreciated, the lowered position of the basket assembly 106 may be useful in situations where the receptacle 152 (FIG. 1) is empty or has only a few amount of items. In operation, the actuator 109 may respond to an increase in a package level as more packages are placed in the receptacle 152. Accordingly, the actuator 109 may be adjusted to cause the basket assembly 106 to move upwards and/or rotate until the position of the basket assembly 106 is as shown in FIG. 1. As the basket assembly 106 is capable of rotation about the rod 133, the basket assembly 106 may be configured to clear a top of the receptacle 152, for example, when the receptacle 152 has reached a maximum amount of items.

In various embodiments, the actuator 109 comprises a linear actuator where an actuator rod 158 is extended from or retracted into an interior of the actuator 109. The actuator rod 158 may be coupled to the support arm 112 by an actuator connector 162 to cause the support arm 112 to move vertically relative to the static frame assembly 103, for example, when the actuator rod 158 is extended or retracted. A dampening member 163 may be coupled between an end of the basket assembly 106 and the support arm 112 using fasteners 168a and 168b, such as eye screws, U-bolts, loops, S-hooks, or other suitable fasteners. In various embodiments, the dampening member 163 comprises a dampening spring 165. In other embodiments, the dampening member 163 may comprise a dampening spring 165 positioned between two portions of rope to allow some shock absorption when the basket assembly 106 is lowered.

Further, the first frame 139a of the basket assembly 106 may comprise a first frame arm 172a coupled to a second frame arm 172b, thereby forming an L-shaped frame. Similarly, a second frame 139b may comprise a third frame arm 172c coupled to a fourth frame arm 172d to form another L-shaped frame. In some embodiments, the first frame arm 172a may extend substantially orthogonal to the second frame arm 172b while the third frame arm 172c extends substantially orthogonal to the fourth frame arm 172d.

To form a basket that receives packages or other items, the catch material 145 may be disposed between the frames 139 by attaching the catch material 145 along the catch supports 142. The catch supports 142 may be fashioned such that the basket embodies a shape suitable to catch and dampen an impact of an item before it is placed in the receptacle 152. In some embodiments, the catch supports 142 may include rigid or flexible members that form a ramp that allows an item to slide into the receptacle 152. In another embodiment, the catch supports 142 may be coupled to the first frame 139a and the second frame 139b in a curved or bowed fashion to facilitate formation of curved basket. For example, a first end 175a of the first catch support 142a may be coupled to the first frame 139a near a distal end of the first frame arm 172a, and a second end 175b of the first catch support 142a may be coupled to the first frame 139a near a distal end of the second frame arm 172b. Similarly, a first end 178a of the second catch support 142b may be coupled to the second frame 139b near a distal end of the third frame arm 172c, and a second end 178b of the second catch support 142b may be coupled to the second frame 139b near a distal end of the fourth frame arm 172d. The catch supports 142 may comprise a flexible material to absorb shock when an item makes contact with the basket.

A connecting member 184 may further couple the first frame 139a and the second frame 139b to provide additional support to the basket assembly 106, if necessary. Although the connecting member 184 is shown in FIG. 4 as being located between the second frame arm 172b and the fourth frame arm 172d in a lower portion of the basket assembly 106, the connecting member 184 could be at other locations, such as between the first frame arm 172a and the third frame arm 172c, e.g., at either distal end of the frame arms 172a and 172c. The location of the connecting member 184 between the first frame arm 172a and third frame arm 172c may be preferable to avoid potential interference with items being deposited into the receptacle 152. In other embodiments, multiple connecting members 184 can be employed, such as a first connecting member 184 located between the first frame arm 172a and the third frame arm 172c as well as a second connecting member 184 located between the second frame arm 172b and the fourth frame arm 172d.

In some embodiments, the catch supports 142 may comprise a flexible tube material, such as polyvinyl chloride (PVC), fiberglass, or other flexible material, to facilitate the curvature of the catch supports 142. In other embodiments, the catch supports 142 may comprise a rigid material, such as aluminum, steel, or other suitable material fabricated to have a predefined shape, such as a curved or linear shape. In various embodiments, the catch supports 142 may be substantially L-shaped or J-shaped, although other shapes are within the scope of the embodiments described herein. For example, the catch supports 142 may be substantially linear to form a ramp or a slide of the catch material 145 disposed between the catch supports 142.

In various embodiments, a sensor 182 can be coupled to the static frame assembly 103 or the moving frame assembly 104, for example, at a distal end of one of the static frame members 125 or one of the moving arms 121. The sensor 182 may be configured to measure a level of packages or other items residing in the receptacle 152. The level of packages or other items residing in the receptacle 152 may be used to control a position of the basket assembly 106 using the actuator 109, as will be discussed. To this end, in some embodiments, the sensor 182 may comprise a proximity sensor, such as a laser sensor, a sonar sensor, a radar sensor, an ultrasonic sensor, or other suitable sensor to measure the level of the packages or other items residing in the receptacle 152. In other embodiments, the sensor 182 may comprise a digital imaging device and visual image analysis may be applied to at least one digital image captured by the digital imaging device to determine the level of the packages or other items residing in the receptacle 152.

Figure 5:
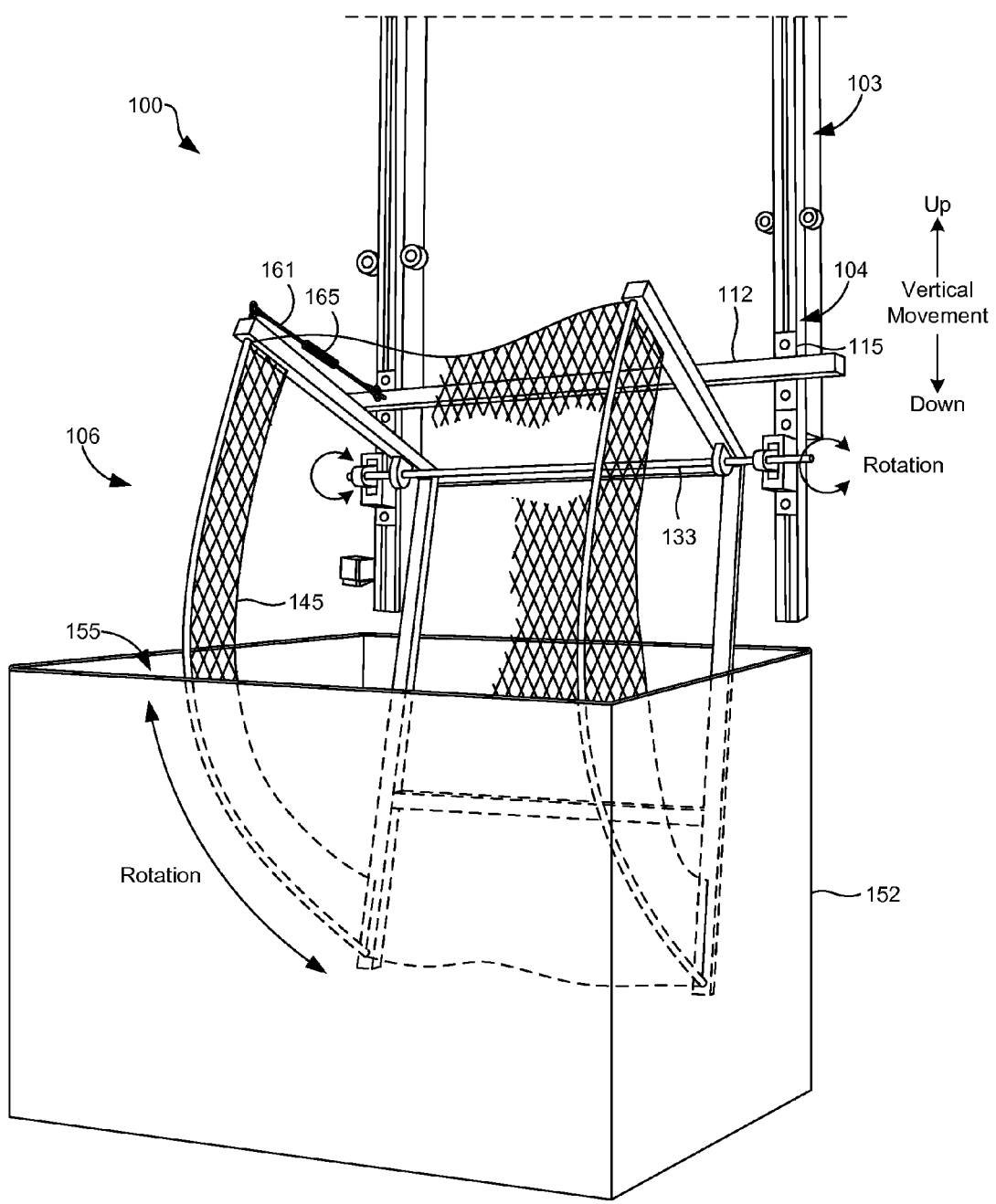

Moving on to FIG. 5, shown is another example of the soft catch apparatus 100 according to various embodiments. In the example of FIG. 5, the basket assembly 106 is shown in a lowered position, where a portion of the basket assembly 106 extends into the interior 155 of the receptacle 152. As may be appreciated, the illustrated position of the basket assembly 106 may be useful in situations where the receptacle 152 is empty or has a low level of items.

As receptacles 152 are filled with packages or items, the receptacle 152 may need to be replaced with an empty receptacle 152. Accordingly, it may be beneficial to vertically raise and/or rotate the basket assembly 106 about the rod 133 as receptacles 152 are filled with items, such that the basket assembly 106 fully clears the receptacle 152 when the receptacle 152 is filled.

To accomplish this, the actuator 109 (FIG. 1) causes the basket assembly 106 to move vertically (e.g., upwards or downwards) until the basket assembly 106 reaches a predefined position where the basket assembly 106 may be rotated to a substantially horizontal position where the basket assembly 106 fully clears the receptacle 152. While the basket assembly 106 is being rotated about the rod 133, the basket assembly 106 maintains a suitable position where the catch material 145 will catch and/or receive the package or other item while absorbing any impact. For example, if the catch material 145 forms a basket, the package or other item will slide down a curved portion of the catch material 145 to softly land in an interior 155 of the receptacle 152. As a result, the height of the fall of the item is greatly reduced.

Figure 6:
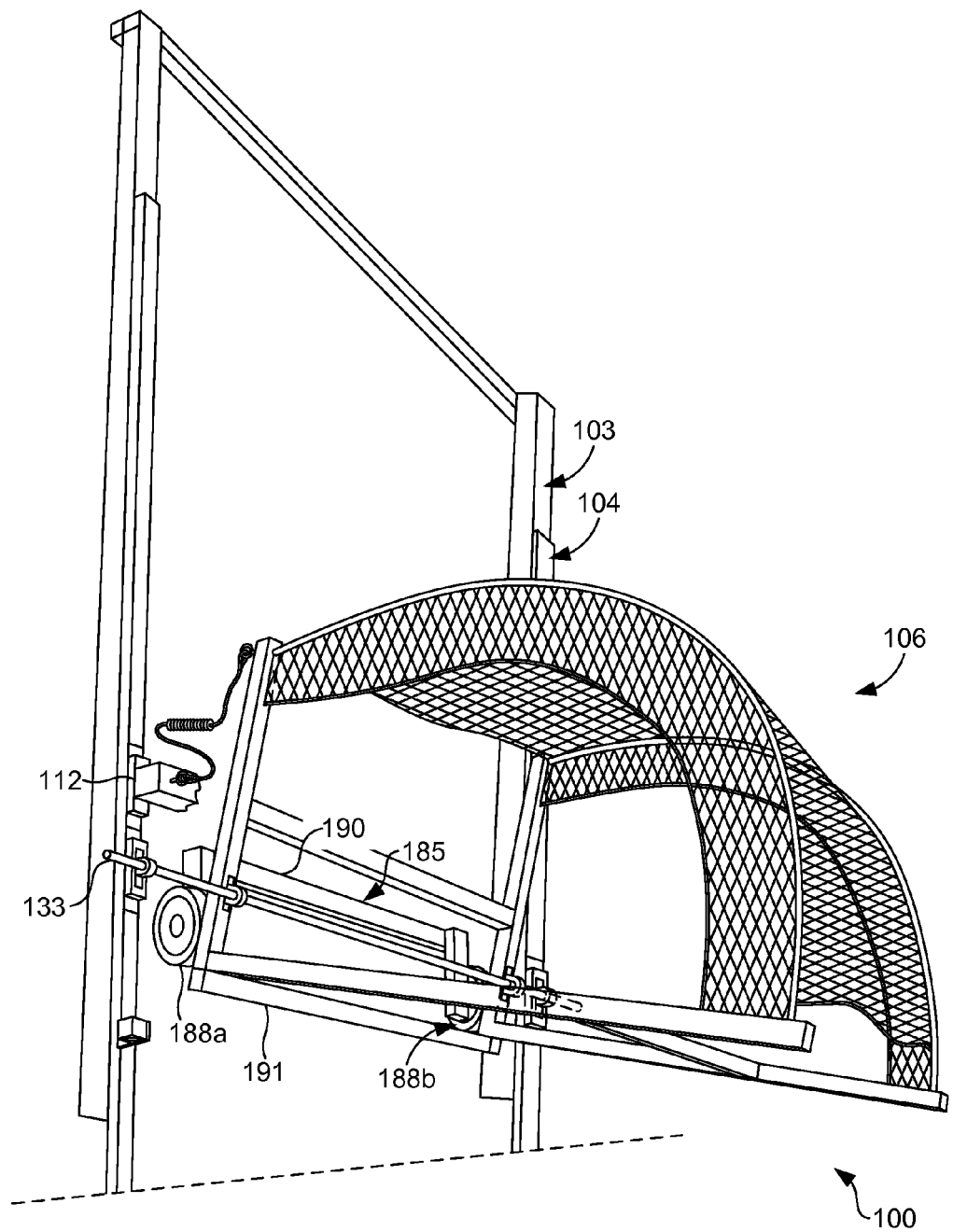

Turning now to FIG. 6, shown is another example of the soft catch apparatus 100 according to various embodiments. In the example of FIG. 6, the basket assembly 106 is shown in a substantially raised position, where the basket assembly 106 would not extend into an interior 155 (FIG. 1) of a receptacle 152 (FIG. 1). As may be appreciated, the illustrated position of the basket assembly 106 in FIG. 6 may be useful in situations where a receptacle 152 is full and the receptacle 152 needs to be moved and/or replaced with an empty receptacle 152.

In an example operation where the basket assembly 106 is in a position where a portion of the basket assembly 106 is in the interior 155 of the receptacle 152, the actuator 109 (FIG. 1) causes the basket assembly 106 to incrementally move vertically in an upward direction, e.g., based on data received from sensor 182, until the basket assembly 106 reaches a predefined position. At this predefined position, a rotation of the basket assembly 106 may be initiated that incrementally brings the basket assembly 106 to the raised position shown in FIG. 6 where the basket assembly 106 fully clears the receptacle 152.

The rotation of the basket assembly 106 may be facilitated using a wheel assembly 185. In various embodiments, the wheel assembly 185 can be fixed to the static frame assembly 103 or otherwise fixed in a suitable position, such that the moving frame assembly 104 and basket assembly 106 move relative to the wheel assembly 185 when the actuator 109 retracts or extends. The wheel assembly 185 may comprise wheels 188a and 188b (collectively wheels 188) coupled to one another using a wheel assembly arm 190. The wheel assembly 185 may be configured to come into contact with a pivot bar 191, the first frame 139a, and/or the second frame 139b of the basket assembly 106 once the basket assembly 106 has reached a particular height. As the actuator 109 continues to incrementally raise the support arm 112, the contact between the pivot bar 191, the first frame 139a and/or the second frame 139b and the wheel assembly 185 further causes the basket assembly 106 to rotate.

Figure 7A:
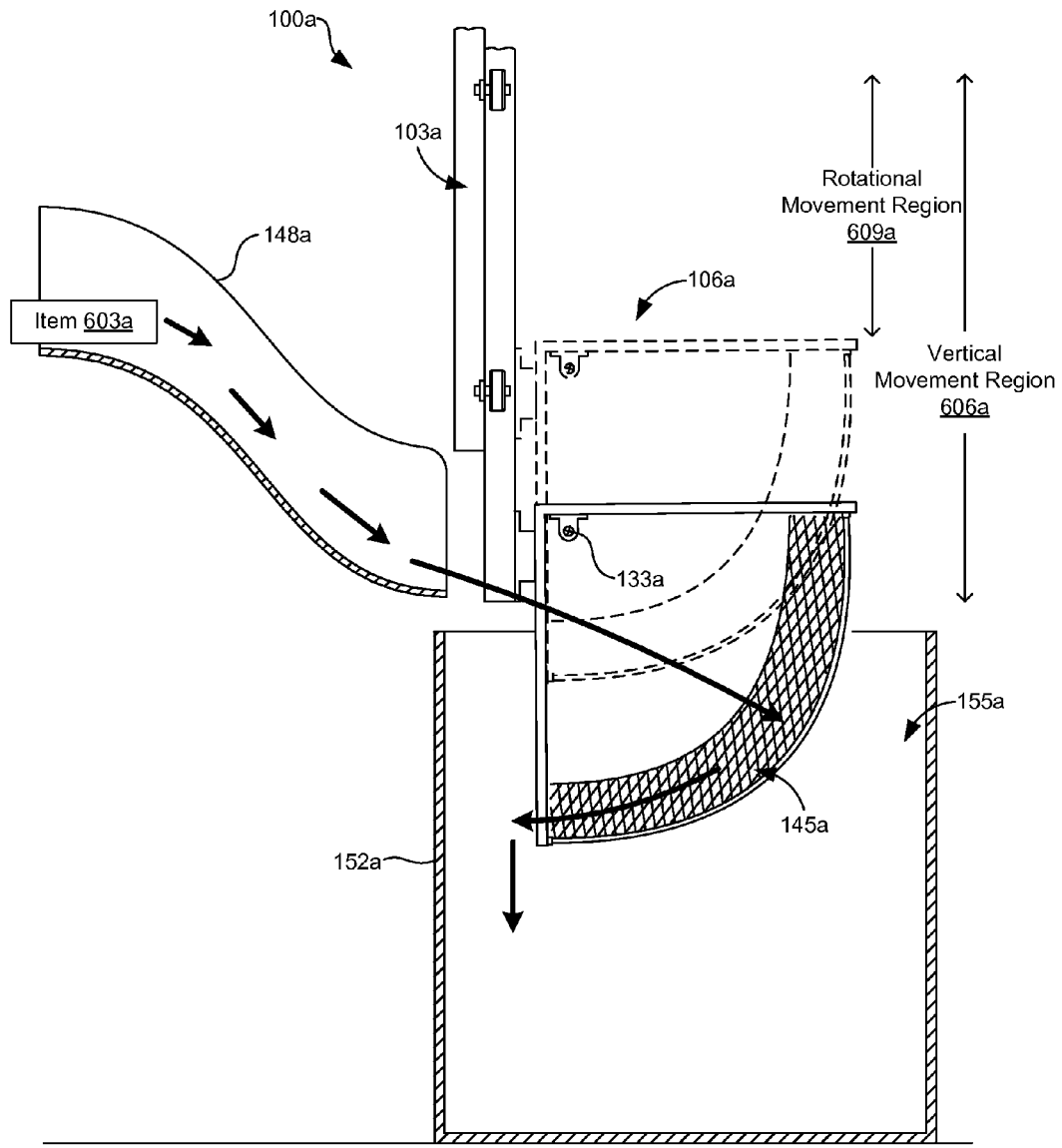
FIGS. 7A-7B are profile views of the soft catch apparatus shown in FIGS. 1-6 during an example operation according to various embodiments of the present disclosure.

Referring next to FIG. 7A, shown is a side view of the soft catch apparatus 100a according to various embodiments. During operation of the soft catch apparatus 100a, an item 603a, such as a package, an envelope, or a box, may be displaced from a conveyer belt or other similar device using the chute 148a. Initially, the actuator 109 (FIG. 1) of the static frame assembly 103 may be extended to position the basket assembly 106a in a substantially lowered position. In this position, items 603a may be received and then placed into the interior 155a of the receptacle 152a. The actuator 109 may incrementally raise the basket assembly 106 while items 603a fill up the receptacle 152a to make room for additional items 603a. Additionally, as the level of items 603a in the receptacle 152a increases, a fall height for items 603a is decreased.

In various embodiments, a vertical movement region 606a may include a region where the basket assembly 106a is raised vertically without rotating the basket assembly 106a about the rod 133a. After the basket assembly 106a has reached a predefined position (e.g., the start of the rotational movement region 609a), the basket assembly 106a may incrementally rotate about the rod 133a while being raised vertically.

Further, within the vertical movement region 606a, the basket assembly 106a may be positioned such that the items 603a make contact with the catch material 145a when discharged from the chute 148a. As a result, the force of the item 603a, as it leaves the chute 148a, conveyer belt, or other device, is dampened or reduced. For example, if the catch material 145a forms a basket, the item 603a will slide down a curved portion of the catch material 145a to softly land in an interior 155a of the receptacle 152a. In embodiments where the catch supports 142 (FIG. 1) are flexible tubing, such as PVC tubing, the catch supports 142 may absorb some of the force received from the item 603a.

Figure 7B:
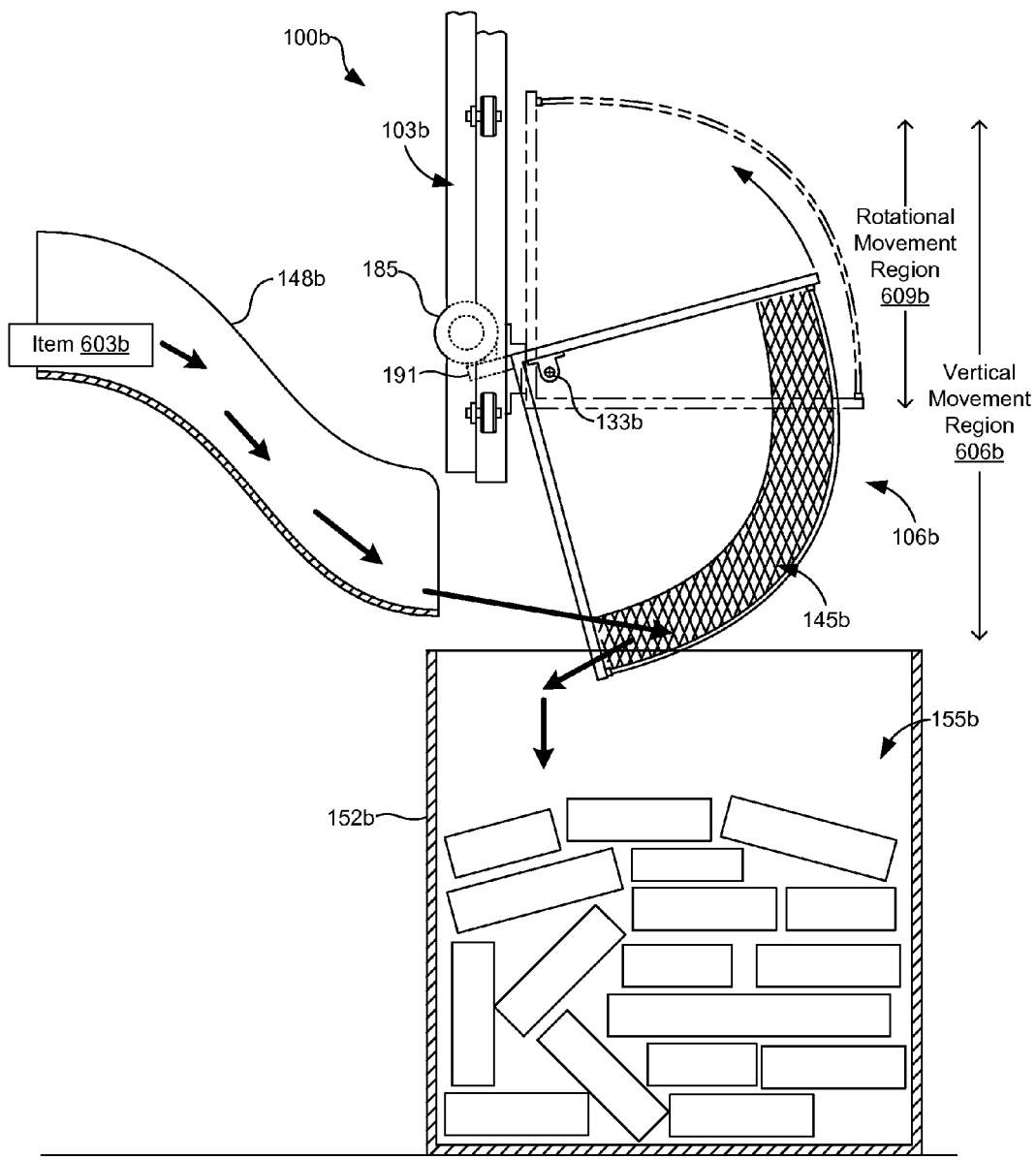

Turning now to FIG. 7B, shown is another side view of the soft catch apparatus 100b according to various embodiments. After the basket assembly 106b has reached a predefined position, e.g., after the basket assembly 106b has moved vertically to a start of the rotational movement region 609b, the basket assembly 106b may be rotated about the rod 133b and/or raised vertically to clear the basket assembly 106b from a top of the receptacle 152b, e.g., while in the rotational movement region 609b.

In various embodiments, the predefined position may be established based on a placement of the pivot bar 191, the first frame 139a and/or the second frame 139b and the wheel assembly 185 in the structure of the soft catch apparatus 100b. In other words, the vertical movement region 606b and/or the rotational movement region 609b are regions defined by the dimensions and placement of the components of the soft catch apparatus 100b. For example, the wheel assembly 185 may be configured to come into contact with the pivot bar 191, the first frame 139a and/or the second frame 139b of the basket assembly 106b once the basket assembly 106b has reached a particular height. As the actuator 109 continues to incrementally raise the support arm 112 (FIG. 1), the contact between the pivot bar 191, the first frame 139a and/or the second frame 139b and the wheel assembly 185 further causes the basket assembly 106 to rotate. After completion of the movement in the rotational movement region 609b, the basket assembly 106b may be maintained in a substantially horizontal or raised position, such as the position of FIG. 1 or FIG. 6 so that the receptacle 152b positioned underneath portions of the soft catch apparatus 100b can be easily removed or replaced.

While the basket assembly 106b is rotated in part about the rod 133b, the basket assembly 106b may be positioned such that the item 603b leaving the chute 148b makes contact with the catch material 145b. Although the angle of the basket assembly 106b may change as it is being rotated, a higher level of items 603b in the receptacle 152b relies upon a smaller part of the slide formed by the catch material 145b.

The item 603b may come into contact with the catch material 145b and potentially slide down the path of the catch material 145b to softly land in an interior 155b of the receptacle 152b.

While FIGS. 5, 6, and 7A-7B describe a rotational movement region 609b where the basket assembly 106 is rotated, the rotation of the basket assembly 106 may be optional. For example, in various embodiments, the basket assembly 106 may be raised vertically to fully clear the receptacle 152 without any rotation of the basket assembly 106.

Figure 8:
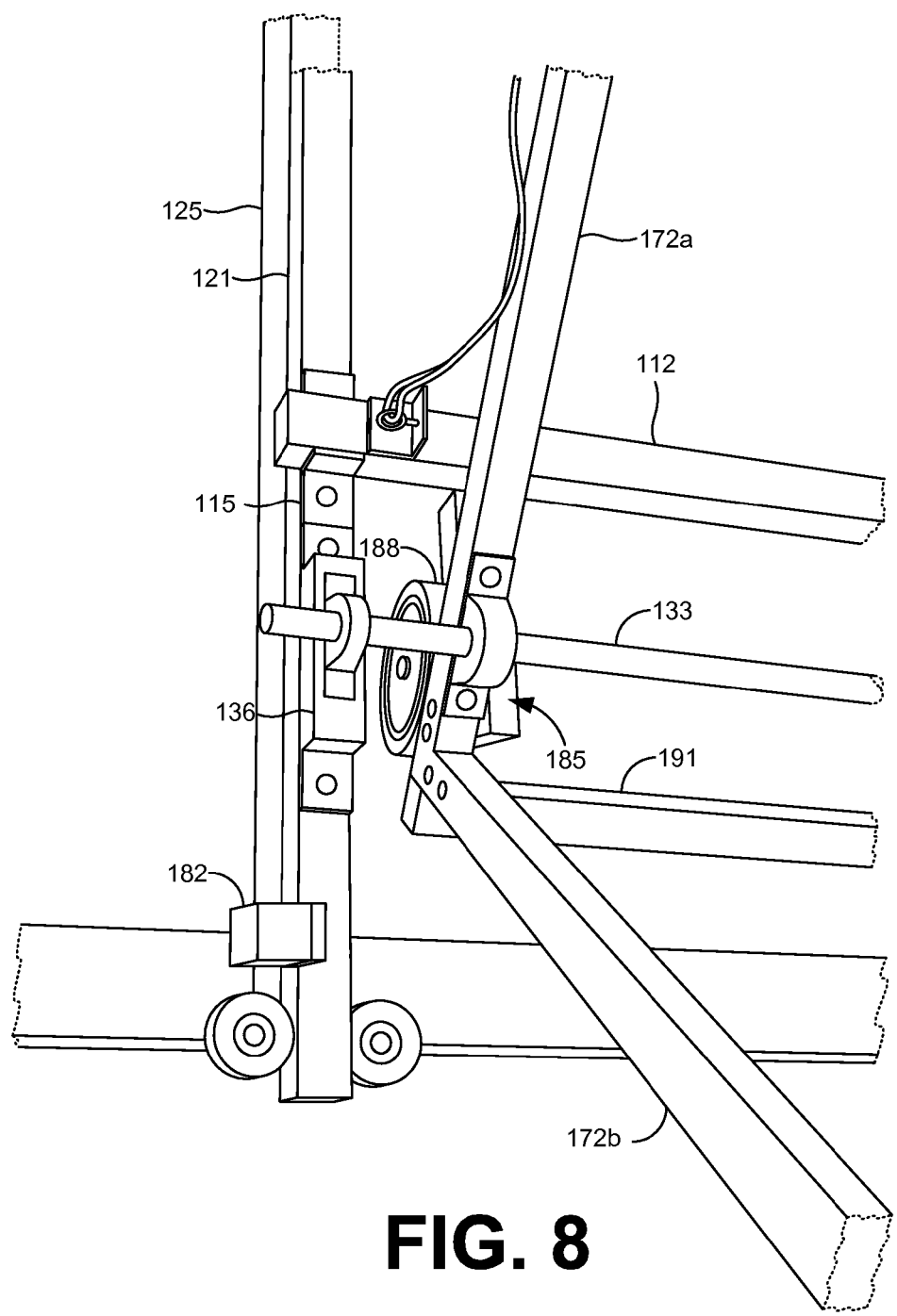
FIGS. 8-10 are drawings of the soft catch apparatus of FIGS. 1-6 according to various embodiments of the present disclosure.

Referring next to FIG. 8, shown is an example of a portion of the soft catch apparatus 100 according to various embodiments. The rotation of the basket assembly 106 may be caused using a contact made between a wheel assembly 185 of the static frame assembly 103 (FIG. 1) and the pivot bar 191, the first frame 139a and/or the second frame 139b of the basket assembly 106 (FIG. 1) once the basket assembly 106 has reached a particular height. In one embodiment, a wheel 188 of the wheel assembly 185 may come into contact with the pivot bar 191 of the basket assembly 106, causing the basket assembly 106 to rotate as the actuator 109 incrementally raises the support arm 112. Once contact has been established, the back side of the frame arms 172a and 172b and/or the pivot bar 191 may maintain contact with the wheel 188, thereby causing the wheel 188 to be in rolling engagement with the rotating basket assembly 106.

Figure 9:
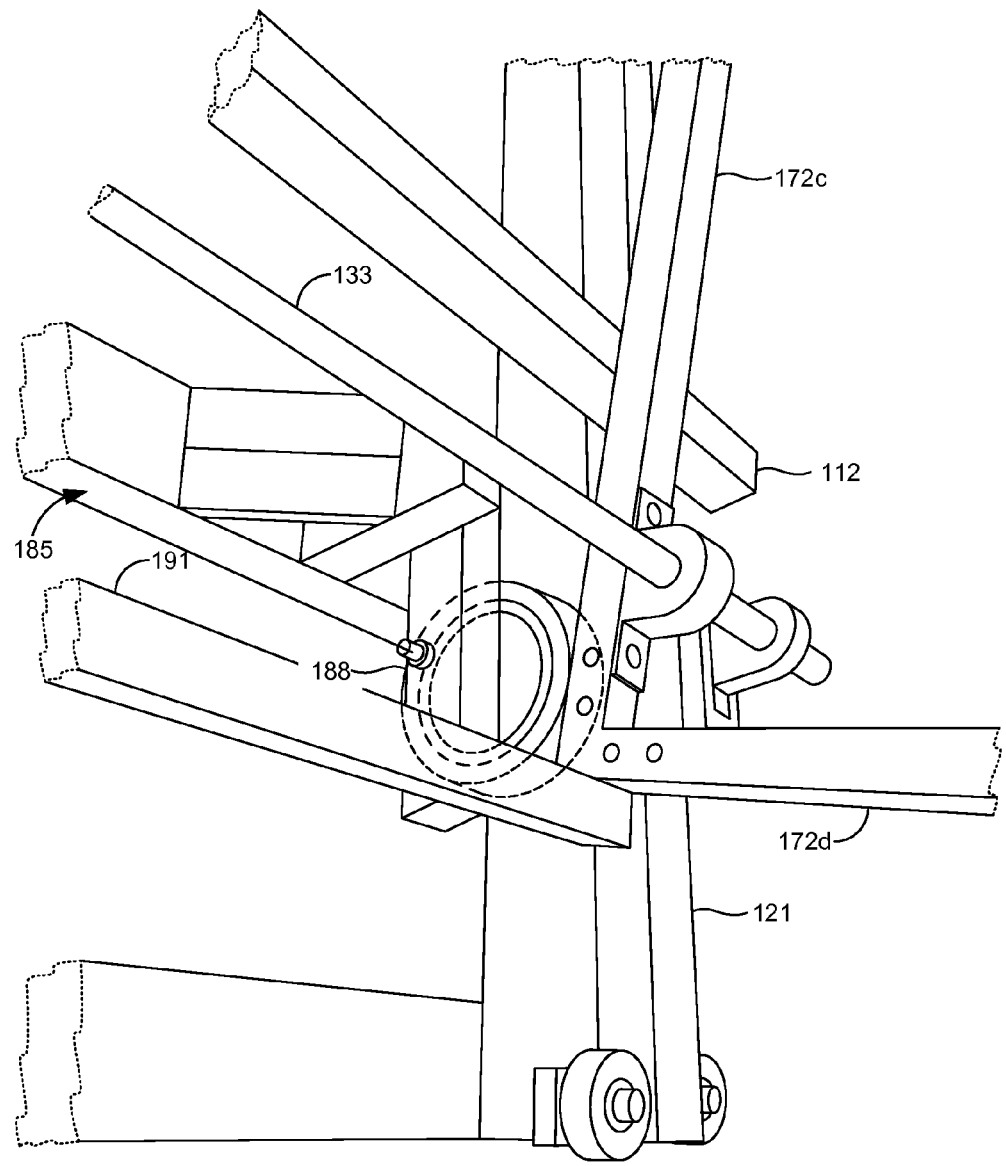

Turning now to FIG. 9, shown is another example of a portion of the soft catch apparatus 100 according to various embodiments. In the example of FIG. 9, the wheel 188 of the wheel assembly 185 is shown in contact with the pivot bar 191 of the basket assembly 106 (FIG. 1). As the actuator 109 (FIG. 1) of the static frame assembly 103 (FIG. 1) raises the support arm 112, the basket assembly 106 continues to rise vertically until contact has been established between the pivot bar 191 and the wheel 188. Once the basket assembly 106 has made suitable contact with the wheel 188, further raising of the support arm 112 by the actuator 109 causes the basket assembly 106 to rotate about the wheel 188 and rod 133 until the basket assembly 106 has reached a horizontal position, such as the position shown in FIGS. 1 and 6.

Figure 10:
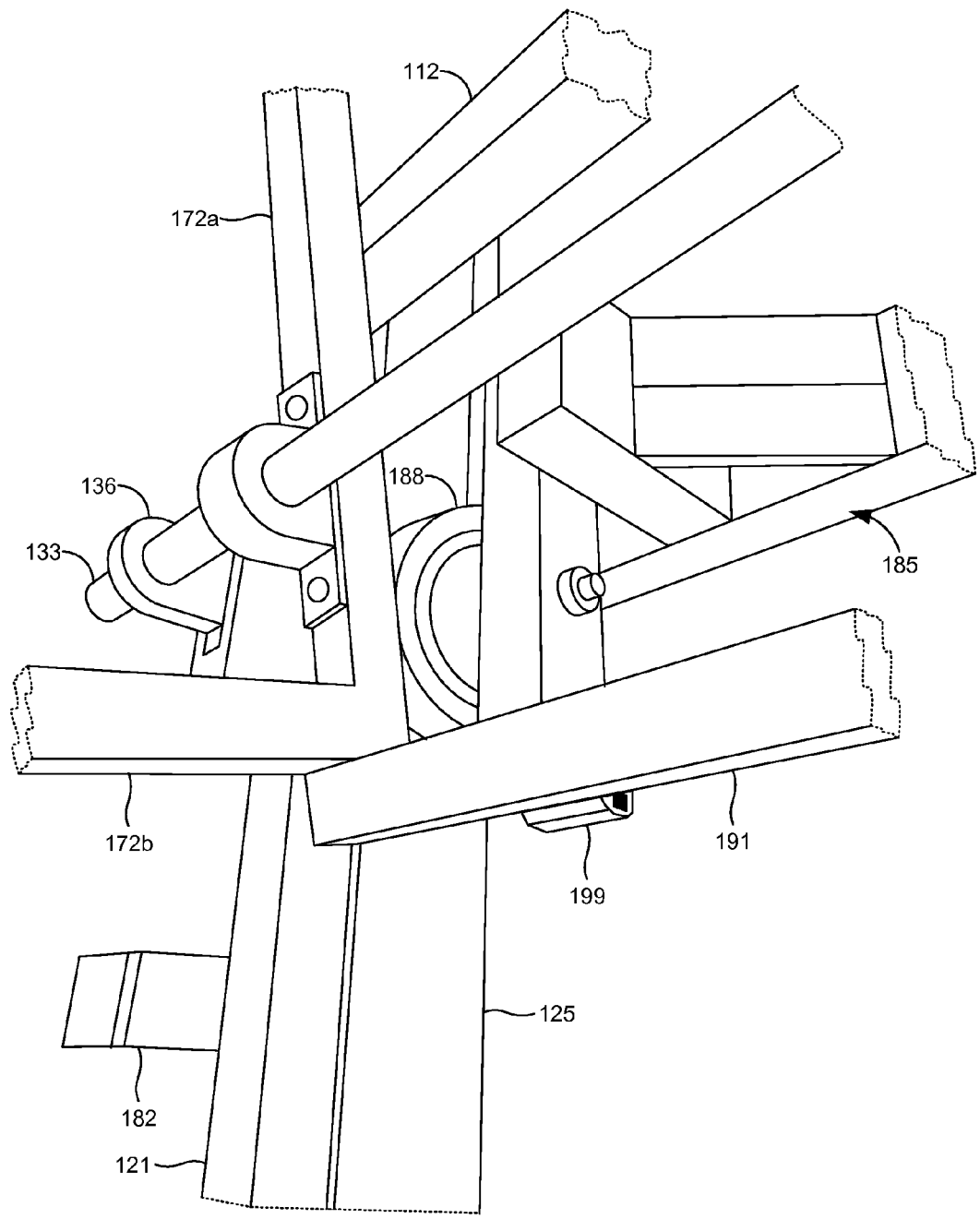

Moving on to FIG. 10, shown is an example of a portion of the soft catch apparatus 100 according to various embodiments. As noted above, in one embodiment, the rotation of the basket assembly 106 is caused using a contact made between a wheel assembly 185 of the static frame assembly 103 (FIG. 1) and the pivot bar 191 of the basket assembly 106 (FIG. 1) once the basket assembly 106 has reached a particular height. For example, the pivot bar 191 may come into contact with a contact surface of the wheel assembly 185 before any other part of the basket assembly 106 contacts the wheel 188. The contact surface may comprise a surface of the wheel assembly 185 or a suitable component attached to the wheel assembly 185 with a particular shape or characteristic that facilitates sliding or rotation. In one embodiment, a wheel assembly surface contact extender 199 may be employed to extend a length of the wheel assembly 185 such that contact between the wheel assembly 185 and the pivot bar 191 is made before the pivot bar 191, the first frame 139a and/or the second frame 139b of the basket assembly 106 makes contact with the wheel 188. For example, the wheel assembly surface contact extender 199 of the wheel assembly 185 may come into contact with the pivot bar 191 of the basket assembly 106, causing the basket assembly 106 to rotate as the actuator 109 incrementally raises the support arm 112 until the pivot bar 191, the first frame 139a and/or the second frame 139b makes contact with the wheel 188. The wheel assembly surface contact extender 199 may comprise a component coupled to a suitable member of the wheel assembly 185 to engage the pivot bar 191. In various embodiments, the wheel assembly surface contact extender 199 may comprise a clip device that is configured to engage with a component of the wheel assembly 185 and contact a surface of the pivot bar 191. In other embodiments, the wheel assembly surface contact extender 199 may comprise a wheel. Once contact has been established between the wheel assembly surface contact extender 199 and the pivot bar 191, the back side of the frame arms 172a and 172c and/or the pivot bar 191 may come into contact with the wheel 188, thereby causing the wheel 188 to be in rolling engagement with the rotating basket assembly 106.

In various embodiments, an actuator, such as a motor, may be employed in place of the wheel assembly 185 and pivot bar 191 to cause the rotation of the basket assembly 106 around the rotational axis, e.g., the rod 133. In embodiments where the actuator comprises a motor, the motor may comprise an electric motor, a hydraulic motor, a pneumatic motor, or other suitable motor. Further, in various embodiments, an actuator may be employed to move the basket assembly 106 horizontally. For example, the actuator may move the moving frame assembly 104 and/or the basket assembly 106 along a horizontal track to direct placement of items 603 (FIGS. 7A-7B) in appropriate portions of the receptacle 152 (FIG. 1), such as portions of the receptacle 152 with a low level of items 603.

Figure 11:
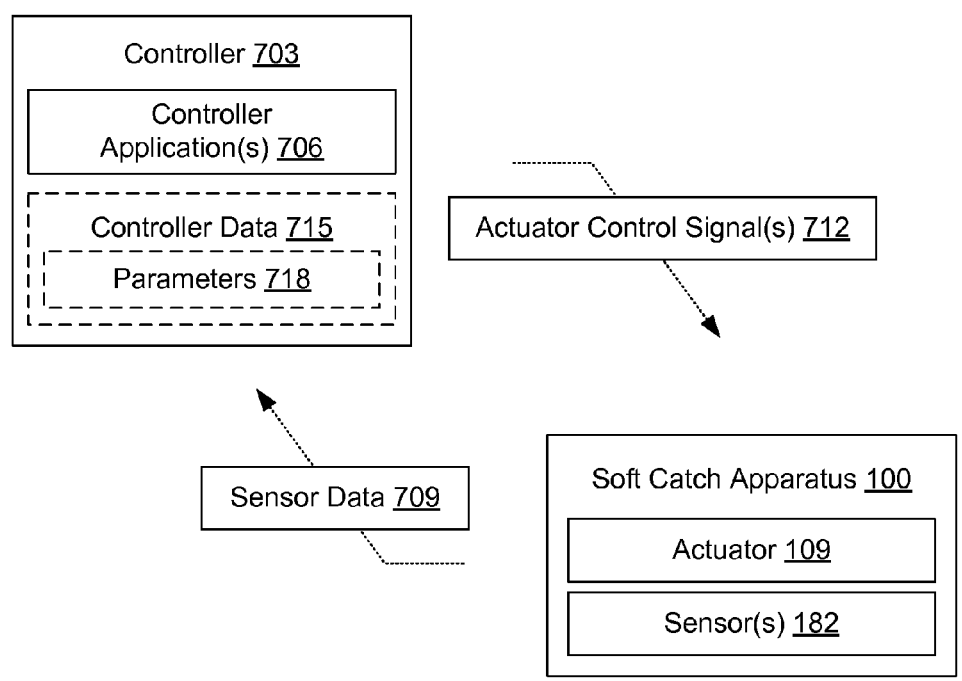
FIG. 11 is a schematic block diagram that provides one example illustration of a controller employed in the soft catch apparatus shown in FIGS. 1-6 according to various embodiments of the present disclosure.

Turning now to FIG. 11, shown is a schematic diagram describing operation of the soft catch apparatus 100 according to various embodiments. A controller 703 may be employed to control movement of the actuator 109, the moving frame assembly 104 and/or the basket assembly 106 (FIG. 1) according to various embodiments. The controller 703 may comprise, for example, a processor-based system such as a computer system. Such a computer system may be embodied in the form of a microcontroller, a desktop computer, a laptop computer, a personal digital assistant, a cellular telephone, a smartphone, a tablet computer, or other devices with like capability. In various embodiments, the controller 703 may include a display, such as a liquid crystal display (LCD) display, a gas plasma-based flat panel display, an organic light emitting diode (OLED) display, an electrophoretic ink (E ink) display, or other types of display devices, etc.

The controller 703 may be configured to execute various applications such as controller applications 706 and/or other applications. The controller applications 706 may be executed in the controller 703, for example, to receive sensor data 709 generated by one or more sensors 182 of the soft catch apparatus 100 and to generate actuator control signals 712 that control the movement of the actuator 109. Further, the controller applications 706 may utilize controller data 715, such as parameters 718 predefined by an administrator, to control operation of the soft catch apparatus 100. The parameters 718 may define, for example, a movement speed, direction or other operating parameters of the actuator 109.

In various embodiments, the controller applications 706 generate actuator control signals 712 to incrementally raise moving frame assembly 104 and/or basket assembly 106 via the actuator 109. In some embodiments, the raising of the basket assembly 106 may be performed in a single continuous motion. In alternative embodiments, a pause may be imposed after each incremental step where the basket assembly 106 is raised and/or rotated to briefly allow the basket assembly 106 to catch or receive one or more items 603 (FIGS. 7A-7B). In some embodiments, an incremental increase in the raising and/or rotating of the basket assembly 106 is performed based on an analysis of the sensor data 709. For example, if the sensor data 709 indicates that a level of items 603 in the receptacle 152 exceeds a threshold, the basket assembly 106 may be further raised and/or rotated.

Figure 12:
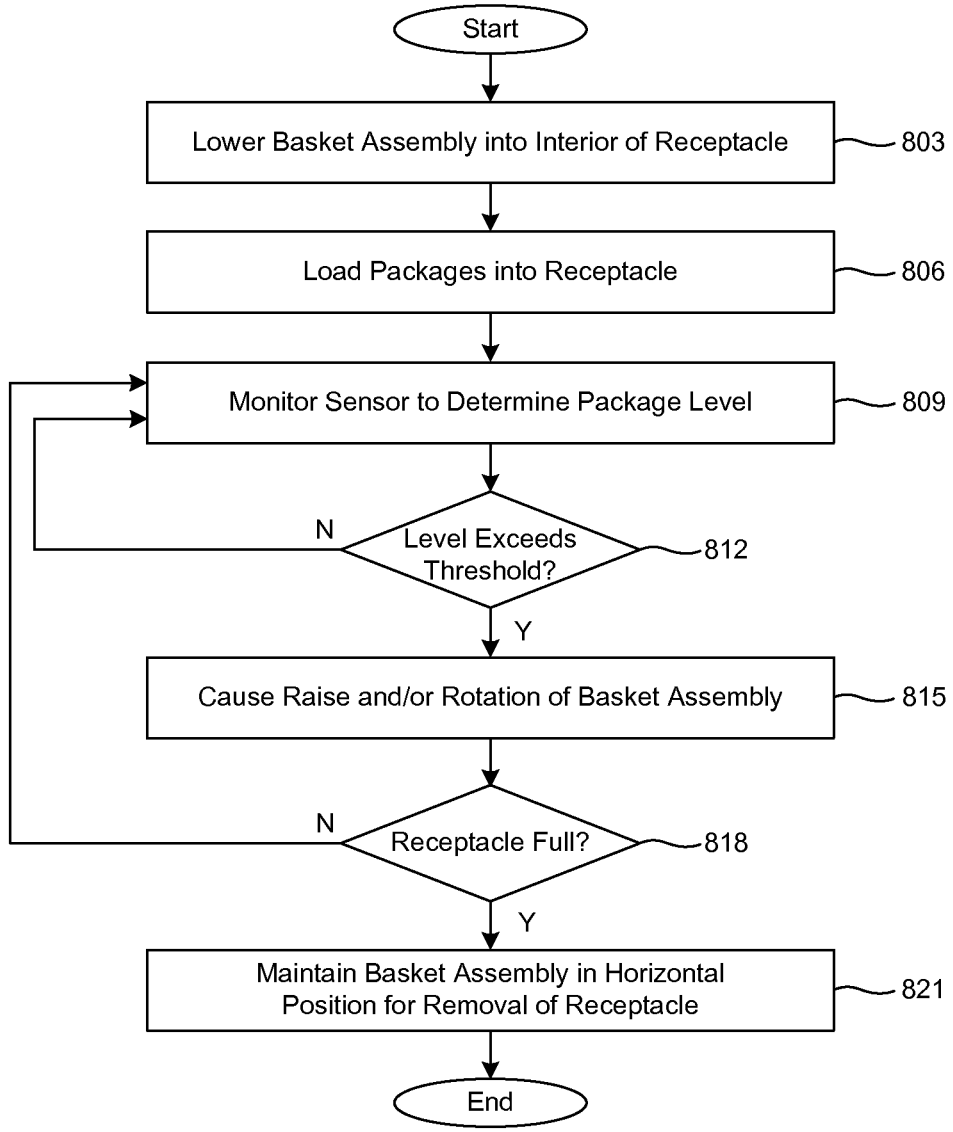
FIG. 12 is a flowchart illustrating a process of soft catching packages implemented by the soft catch apparatus shown in FIGS. 1-6 according to various embodiments of the present disclosure.

Referring next to FIG. 12, shown is a flowchart that provides one example of the operation of the soft catch apparatus 100 (FIG. 1) according to various embodiments. It is understood that the flowchart of FIG. 12 provides merely an example of the many different types of functional arrangements that may be employed to implement the operation of the soft catch apparatus 100 as described herein. As an alternative, the flowchart of FIG. 12 may be viewed as depicting an example of elements of a method implemented by the controller 703 according to one or more embodiments.

Beginning with 803, the basket assembly 106 (FIG. 1) of the soft catch apparatus 100 may be lowered to the interior 155 (FIG. 1) of the receptacle 152 (FIG. 1). In various embodiments, the controller 703 sends a suitable actuator control signal 712 (FIG. 11) to the actuator 109 (FIG. 1) of the soft catch apparatus 100 to cause the lowering of at least a portion of the basket assembly 106 into the interior 155 of the receptacle 152.

Once the basket assembly 106 is lowered, in 806, packages may begin being loaded into the receptacle 152 using the soft catch apparatus 100. In various embodiments, this may include sending a control signal to a conveyer belt, assembly line, package sorter, or other system to move packages or items 603 (FIGS. 7A-7B) down the chute 148 (FIG. 1). As the items 603 exit the chute 148, the catch material 145 is positioned in a location to absorb impact of the items 603. For example, when the items 603 make contact with the catch material 145, the force of the items as they leave the chute 148, conveyer belt, or other device is dampened or reduced. For example, if the catch material 145 forms a basket, the item 603 may slide down a curved portion of the catch material 145 to gently land in an interior 155 of the receptacle 152.

Next, in 809, the sensor 182 (FIG. 4) of the soft catch apparatus 100 is monitored to determine a level of items 603 residing in the receptacle 152. In various embodiments, the level of packages or items 603 residing in the receptacle 152 may be used to control a position of the basket assembly 106 using the actuator 109. To this end, the sensor 182 may comprise a proximity sensor that uses laser, sonar, radar, or other suitable medium to measure the level of the packages or items 603 residing in the receptacle 152.

In 812, it is determined whether the level of packages or items 603 residing in the receptacle 152 exceeds a predefined threshold that indicates, for example, that the basket assembly 106 needs to be raised. If the level of packages does not exceed the predefined threshold, the process may revert back to 809 to continue determining the package level of the items 603 in the receptacle 152 using the sensor 182. However, if the level of packages exceeds the predefined threshold, the process may continue to 815 where the basket assembly 106 is raised vertically and/or rotated.

In various embodiments, raising the basket assembly 106 comprises generating a suitable actuator control signal 712 that causes the actuator 109 to retract the support arm 112. As a result, the basket assembly 106 will incrementally move and/or rotate upwards to a suitable position while the catch material 145 continues to catch and receive items 603 from the chute 148.

In some embodiments, the basket assembly 106 may be incrementally raised until the basket assembly 106 has been raised to a predefined position. At this position, the basket assembly 106 may be incrementally rotated and/or raised to clear the basket assembly 106 from a top of the receptacle 152. The vertical movement region 606 includes the region where the basket assembly 106 is raised vertically. The rotational movement region 609 includes the region where the basket assembly 106 is rotated and/or raised.

The vertical movement region 606 and/or the rotational movement region 609 may be regions defined by the dimensions and placement of the components of the soft catch apparatus 100. For example, the wheel assembly 185 (FIG. 6) may be configured to come into contact with the pivot bar 191, the first frame 139a and/or the second frame 139b (FIG. 6) of the basket assembly 106 once the basket assembly 106 has reached a particular height. As the actuator 109 continues to incrementally raise the support arm 112, the contact between the pivot bar 191, the first frame 139a and/or the second frame 139b and the wheel assembly 185 further causes the basket assembly 106 to rotate.

The process may continue to 818 to determine whether the receptacle 152 is full or has reached its maximum capacity of items 603. If the receptacle 152 is not full, the process may go back to 809 to continue monitoring the sensor to determine whether the basket assembly 106 should be raised. However, if the receptacle 152 is full, the process may proceed to 821 where the basket assembly 106 may be maintained in a horizontal position to facilitate the removal and/or replacement of the receptacle 152 from underneath portions of the soft catch apparatus 100. Thereafter, the process may terminate, or an empty receptacle 152 may replace the full receptacle 152 and the process may start over.

Figure 13:
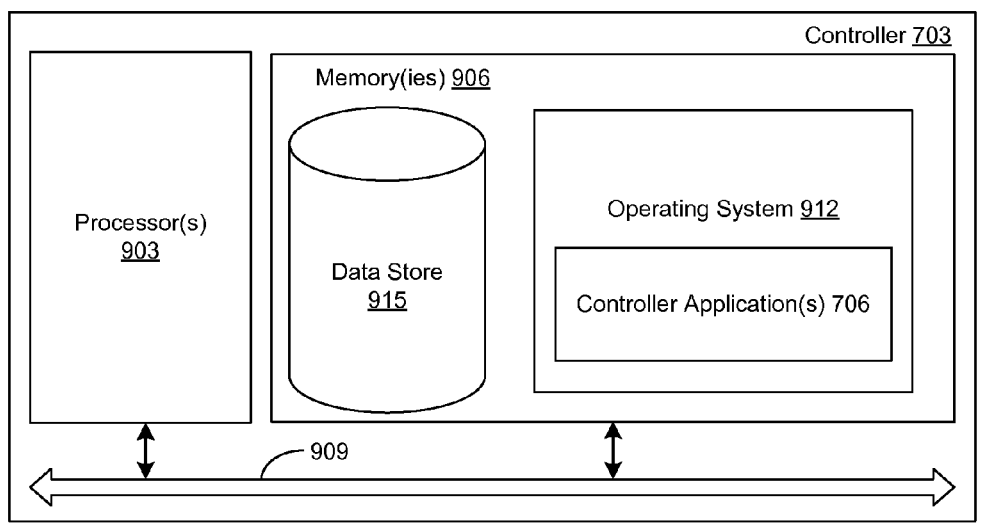
FIG. 13 is a schematic block diagram that provides one example illustration of the controller employed in the soft catch apparatus shown in FIGS. 1-6 according to various embodiments of the present disclosure.

With reference to FIG. 13, shown is a schematic block diagram of the controller 703 according to an embodiment of the present disclosure. The controller 703 may include a computing device that includes at least one processor circuit, for example, having a processor 903 and a memory 906, both of which are coupled to a local interface 909. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are an operating system 912, controller applications 706, and potentially other applications. Also stored in the memory 906 may be a data store 915 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the controller applications 706, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 12 shows the functionality and operation of the soft catch apparatus 100. The operation of the soft catch apparatus 100 may be controlled by the controller 703 and implemented by the controller applications 706. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 12 shows a specific order of execution, it is understood that the order of execution may differ from that which is depicted. For example, the order of execution of two or more blocks may be scrambled relative to the order shown. Also, two or more blocks shown in succession in FIG. 12 may be executed concurrently or with partial concurrence. Further, in some embodiments, one or more of the blocks shown in FIG. 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the controller applications 706, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the controller application 706, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same controller 703. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Therefore, the following is claimed:

1. A system, comprising:
   a static frame assembly;
   a moving frame assembly configured to move vertically relative to the static frame assembly;
   a basket assembly movably coupled to the moving frame assembly, the basket assembly comprising:
      a first frame comprising a first arm and a second arm that extends substantially orthogonal to the first arm;
      a second frame comprising a third arm and a fourth arm that extends substantially orthogonal to the third arm;
      a material secured to the first frame and the second frame to form a basket disposed between the first frame and the second frame; and
   an actuator coupled between the static frame assembly and the moving frame assembly, the actuator being configured to adjust a position of the moving frame assembly to position the basket assembly such that at least one item comes into contact with the basket before placement of the at least one item in a receptacle;
   at least one sensor configured to measure a level of items residing in the receptacle; and
   a controller configured to control a movement of the actuator to position the basket assembly based at least in part on the level of items in the receptacle.

2. The system of claim 1, wherein the movement of the actuator:
   adjusts a height of the basket assembly over a first region of movement; and
   rotates the basket assembly and adjusts the height of the basket assembly over a second region of movement.

3. The system of claim 2, further comprising a wheel assembly configured to contact at least one of the first frame, the second frame or a pivot bar of the basket assembly, wherein the contact causes a transition from the first region of movement to the second region of movement.

4. An apparatus, comprising:
   a static frame assembly comprising an actuator;
   a moving frame assembly moveably attached to the static frame assembly via the actuator; and
   a basket assembly rotationally attached to the moving frame assembly, the basket assembly comprising a catch material configured to receive at least one item,
   wherein the actuator is configured to adjust a position of the basket assembly during placement of the at least one item in a receptacle such that the at least one item contacts the catch material as the at least one item is displaced from a device for placement in the receptacle.

5. The apparatus of claim 4, further comprising at least one sensor configured to detect a level of items in the receptacle.

6. The apparatus of claim 5, further comprising a controller configured to control a movement of the actuator based at least in part on the level of items in the receptacle, wherein the movement of the actuator adjusts the position of the basket assembly.

7. The apparatus of claim 6, wherein the movement of the actuator adjusts a height of the basket assembly over a first region of movement.

8. The apparatus of claim 7, further comprising a pivot bar coupled to the basket assembly, wherein the movement of the actuator causes a contact between the pivot bar of the basket assembly and the static frame assembly over at least a portion of a second region of movement.

9. The apparatus of claim 8, wherein the contact between the pivot bar and the static frame assembly causes the basket assembly to rotate about a rotational axis.

10. The apparatus of claim 4, wherein the basket assembly further comprises:
    a first frame comprising a first arm and a second arm that extends substantially orthogonal to the first arm; and
    a second frame comprising a third arm and a fourth arm that extends substantially orthogonal to the third arm.

11. The apparatus of claim 10, wherein the basket assembly further comprises:
    a first catch support, a first end of the first catch support being coupled to the first frame along the first arm and a second end of the first catch support being coupled to the first frame along the second arm;
    a second catch support, a first end of the second catch support being coupled to the second frame along the third arm and a second end of the second catch support being coupled to the second frame along the fourth arm; and
    wherein the catch material is coupled to the first catch support and the second catch support to form a basket disposed between the first frame and the second frame.

12. A method, comprising:
    causing, by at least one controller, at least a portion of an apparatus to be placed within a receptacle, the apparatus comprising:
       a static frame assembly comprising an actuator; and
       a basket assembly movably coupled to the static frame assembly via the actuator, the basket assembly comprising a catch material; and
    communicating, by the at least one controller, a control signal to the actuator that causes the actuator to perform a movement that adjusts a position of the basket assembly relative to the static frame assembly such that at least one item contacts the catch material in response to the at least one item being discharged from a device for placement in the receptacle.

13. The method of claim 12, further comprising determining, by the at least one controller, a level of items residing in the receptacle based at least in part on sensor data provided by at least one sensor of the apparatus.

14. The method of claim 13, further comprising:
    determining, by the at least one controller, that the level of items residing in the receptacle exceeds a predefined threshold that indicates that a height of the basket assembly relative to the receptacle should be adjusted; and
    communicating, by the at least one controller, a subsequent control signal to the actuator that causes the actuator to adjust the height of the basket assembly.

15. The method of claim 13, wherein the at least one sensor comprises at least one proximity sensor.

16. The method of claim 15, wherein the at least one proximity sensor comprises at least one of a laser sensor, a sonar sensor, a radar sensor, or an ultrasonic sensor.

17. The method of claim 15, wherein the at least one proximity sensor further comprises at least one digital imaging device.

18. The method of claim 17, further comprising applying, by the at least one controller, a visual image analysis of at least one digital image captured by the digital imaging device to determine the level of items residing in the receptacle.

19. The method of claim 12, wherein the device comprises at least one of a conveyer belt, an assembly line, a ramp, a slide, a chute, or a package sorter.

20. The method of claim 12, wherein the movement of the actuator causes the basket assembly to rotate in response to a pivot bar of the basket assembly contacting at least a portion of the static frame assembly.

* * * * *